United States Patent
Hashimoto et al.

(10) Patent No.: US 7,247,240 B2
(45) Date of Patent: *Jul. 24, 2007

(54) METHOD FOR TREATING WASTE WATER (75) Inventors: Takaaki Hashimoto, Himeji (JP);
Kuninori Miyazaki, Himeji (JP);
Junichi Miyake, Akashi (JP); Tohru Ishii, Taishi-cho (JP)

(73) Assignee: Nippon Shokubai Co., Ltd., Osaka (JP)

( * ) Notice: Subject to any disclaimer, the term of this patent is extended or adjusted under 35 U.S.C. 154(b) by 295 days.

This patent is subject to a terminal disclaimer.

(21) Appl. No.: 10/507,302

(22) PCT Filed: Mar. 11, 2003

(86) PCT No.: PCT/JP03/02824

§ 371 (c)(1),
(2), (4) Date: Sep. 10, 2004

(87) PCT Pub. No.: WO03/076348

PCT Pub. Date: Sep. 18, 2003

(65) Prior Publication Data

US 2005/0150845 A1     Jul. 14, 2005

(30) Foreign Application Priority Data

Mar. 11, 2002   (JP) ............................. 2002-065566

(51) Int. Cl.
*C02F 1/74* (2006.01)
(52) U.S. Cl. .................. 210/638; 210/652; 210/668; 210/694; 210/762; 210/763; 210/908
(58) Field of Classification Search ............... 210/762
See application file for complete search history.

(56) References Cited

U.S. PATENT DOCUMENTS

| | | | | |
|---|---|---|---|---|
| 4,699,720 A * | 10/1987 | Harada et al. | ............... | 210/762 |
| 4,861,484 A * | 8/1989 | Lichtin et al. | ............... | 210/638 |
| 5,360,552 A * | 11/1994 | Yan | ........................... | 210/763 |
| 5,405,532 A * | 4/1995 | Loew et al. | ................. | 210/631 |
| 5,571,419 A * | 11/1996 | Obata et al. | ................. | 210/664 |
| 6,403,031 B1 * | 6/2002 | Escude et al. | ................ | 422/28 |
| 6,797,184 B2 * | 9/2004 | Shiota et al. | ............... | 210/762 |

FOREIGN PATENT DOCUMENTS

| | | |
|---|---|---|
| CN | 1059133 | 3/1992 |
| EP | 0 913 193 | 5/1999 |
| EP | 1 116 694 | 7/2001 |
| JP | 11-179378 | 7/1999 |
| JP | 2001-157841 | 6/2001 |
| JP | 2003-80275 | 3/2003 |
| KR | 10-0354281 | 9/2002 |

* cited by examiner

*Primary Examiner*—Peter A. Hruskoci
(74) *Attorney, Agent, or Firm*—Wenderoth, Lind & Ponack, L.L.P.

(57) ABSTRACT

The invention provides a method for treating waste water wherein organic and inorganic substances in waste water can be treated at high levels regardless of the concentration, and a unit itself can be made compact. The method of the invention is a method for treating waste water, which comprises treating waste water at 100° C. or less in the presence of oxygen and catalyst containing noble metal and active carbon and having pores, wherein the volume of pores having a radius of 40 Å or more and less than 100 Å is 0.05 ml/g or more.

34 Claims, 2 Drawing Sheets

METHOD FOR TREATING WASTE WATER

TECHNICAL FIELD

The present invention relates to a method for treating waste water by wet oxidation. In particular, the invention relates to a method for treating waste water by which not only high-degree treatment of organic or inorganic substances contained in waste water is feasible regardless of their concentration but also a device to put the invention into practice can also be made compact.

BACKGROUND ART

As a method for treating waste water, a biological treatment method, a combustion treatment method, a wet oxidization treatment method, or the like have been conventionally widely used. These methods are those for decomposing organic or inorganic chemical substances contained in waste water to make them non-toxic thereby reducing their adverse influence on the environment.

In the biological treatment method, the decomposition of substances to be oxidized is generally time-consuming, and the substances that can be treated are limited to those of low concentration. Therefore, when waste water is at high concentration, it should be diluted to a suitable concentration, thus an extensive area of facilities for treatment is disadvantageously demanded. In addition, byproducts such as excessive sludge are generated, and thus the treatment thereof is often problematic.

In the combustion treatment method, fossil fuel is often used as fuel, resulting in a problem in waste of the resource.

On the other hand, the wet oxidization treatment method for cleaning waste water in liquid phase is excellent without the problems described above. In catalyst-free wet oxidization treatment, however, it is necessary that the reaction be conducted at high temperatures under high pressure and the reaction time be prolonged, thus often necessitating an enlarged device and increasing the operation cost.

As a means of increasing the reaction rate and moderating the reaction conditions, a catalytic wet oxidation treatment method using solid catalyst is proposed. For example, a treatment method using a composite catalyst is described in Japanese Unexamined Patent Publication No. SHO 63-158189, to achieve certain results. However, the conventional catalyst comprising noble metal combined with metal oxide such as titanium oxide often requires high-temperature conditions for achieving efficient treatment and high-pressure conditions for maintaining a liquid phase at such high temperatures, thus suffering from problems such as a higher cost of facilities. When used in combination with an oxidizing agent such as ozone or hydrogen peroxide, the treatment may be made feasible at normal pressures, but is not preferable because of a higher cost of the oxidizing agent.

Japanese Unexamined Patent Publication No. HEI 11-179378 discloses a method for decomposing oxygen-containing organic compound, which can be carried out at a temperature of 100° C. or less. However, the compound to be treated by this prior art method is limited to oxygen-containing compounds having one carbon atom, and in consideration of actual application to waste water from factories and the like, its treatment performance is not satisfactory.

As described above, the wet oxidization treatment method using catalyst is the most excellent to treat waste water, but when efficient treatment is to be realized regardless of the concentration of waste water, there is a problem of inevitably higher costs of facilities, treatment itself and the like.

In view of this, the problem to be solved by the present invention is to provide a technique by which organic and inorganic substances contained in waste water can be treated at high degrees regardless of the concentration and at relatively low temperatures, and thus a device to put the invention into practice can be made compact without requiring large and high-pressure facilities, thus enabling treatment of waste water at low costs.

DISCLOSURE OF INVENTION

To solve the problem described above, the present inventors made intensive study on the wet oxidation treatment method using catalyst, and as a result they found that the problem can be solved by suitably prescribing the constitution and the like of particularly the catalyst, and the present invention was thereby completed.

The method for treating waste water according to the present invention is characterized in comprising treating waste water at 100° C. or less in the presence of oxygen and catalyst containing noble metal and active carbon and having pores, and the volume of the pores having a radius of 40 Å or more and less than 100 Å is 0.05 ml/g or more. The treatment method adopts the above constitution by which waste water can be treated regardless of the concentration under the condition of relatively low temperatures. The conventional method requires pressurization for maintaining a liquid phase or for increasing the content of oxygen in waste water. On the other hand, according to the present invention, the treatment is feasible at almost normal pressures, and high-pressure facilities and the like are not required.

The catalyst is preferably the one having one or more shape selected from the group consisting of a crushed shape, a honeycomb shape and a ring shape. The surface of a catalyst having a crushed shape and the like, as compared with a cylindrical or spherical catalyst, has a complicated surface shape. As the results, the amount of fluid held up among catalyst particles is significantly increased and the retention time of the fluid is substantially prolonged, to achieve an efficient catalyst reaction in the gas/liquid/solid phases.

In the treatment method described above, it is preferable that oxygen-containing gas is used to allow oxygen to be present in the reaction system, and the gas and waste water are subjected preferably to gas/fluid downstream parallel flowing. The efficiency of contacting waste water with the gas is thereby improved, and the amount of oxygen dissolved is increased, thus permitting the oxidative decomposition reaction of toxic substances to proceed efficiently.

Preferably, the waste water contains at least one member selected from the group consisting of formaldehyde, methanol, formic acid, ethanol, acetic acid, ethylene glycol and ammonia. Because there are none of conventional techniques by which waste water containing such compounds can be efficiently treated under the mild conditions of relatively low temperatures and almost normal pressures, thus the above element is important for distinguishing a technical difference between the present invention and the prior art.

In pretreatment for the treatment method described above, the waste water is subjected preferable to membrane treatment and/or adsorption treatment with an adsorbent.

These pretreatment can be combined with the above treatment method to exhibit extremely high performance in treatment of waste water.

The most distinctive feature of the method of treating waste water according to the present invention is that waste water can be treated efficiently at relatively low temperatures regardless of the concentration by using a predetermined catalyst.

That is, a wet oxidation treatment method using catalyst has been developed, but the temperature should be increased to improve treatment efficiency, while the pressure should be increased for maintaining a liquid phase and for increasing the amount of oxygen dissolved therein, thus resulting in higher costs for facilities. The present inventors paid attention to the constitution or the like of the catalyst used, and found that by devising the constitution or the like, treatment efficiency can be significantly improved, and the present invention was thereby completed.

Hereinafter, the embodiments of the present invention exhibiting such characteristics, and the effect thereof, are described.

The present invention relates to a method for treating waste water, which is characterized in comprising treating waste water at 100° C. or less in the presence of oxygen and catalyst containing noble metal and active carbon and having pores, and the volume of the pores having a radius of 40 Å or more and less than 100 Å is 0.05 ml/g or more.

In the conventional method, the amount of oxygen dissolved in fluid, which is required for the reaction, is not enough without pressurization, thus significantly reducing the catalyst activity. In the reaction at normal pressures, therefore, the amount of oxygen dissolved in fluid should be increased. The present inventors made extensive study on a method for increasing the amount of oxygen dissolved, and as a result found that when a catalyst containing active carbon in a wet state is used, oxygen is adsorbed selectively onto the catalyst to improve treatment activity significantly. Accordingly, it is essential for the catalyst used in the present invention to contain active carbon together with a catalytically active noble metal.

As the "noble metal" used in the present invention, one or more element selected from the group consisting of platinum, palladium, ruthenium, rhodium, iridium and gold is preferably contained. The content of the noble metal in the catalyst is preferably 0.01 or more and less than 5 mass %, more preferably 0.03 or more and less than 3 mass %. A content of 5 mass % or more results in an increase in the noble metal not effectively utilized. When the content is less than 0.01 mass %, the noble metal may fail to act effectively on treatment of waste water. The above-mentioned content is a content based on the whole catalyst.

The catalyst in the present invention may contain at least one element selected from the group consisting of manganese, lanthanum, cerium, iron, cobalt, nickel, titanium, zirconium and silicon. By incorporation of these components, adsorptivity may be changed to improve treatment performance.

It is essential for the catalyst used in the present invention to have pores, and the volume of pores having a radius of 40 Å or more and less than 100 Å is 0.05 ml/g or more. It was found for the first time by the present inventors that pores having a radius of 40 Å or more and less than 100 Å in the catalyst are very important for efficient treatment of waste water. When the volume of pores in this range is 0.05 ml/g or more, the time of contacting an active site on the catalyst with an substance to be oxidized can be significantly increased to improve treatment performance significantly.

From this viewpoint, the catalyst having a pore volume of at least 0.1 ml/g is preferably used.

The "pore volume" may be varied slightly depending on the measurement method used, and in the present invention, the pore volume is measured by a nitrogen adsorption method. Specifically, the pore volume is measured by a nitrogen adsorption method (77 K, $10^{-5}$ Torr or less) by using an full automatic gas adsorption unit (for example, Omnisoap 360CX manufactured by Beckman Coulter, Inc.), and calculated from the resulting adsorption isothermal curve by a BJH method.

The shape of the catalyst used in the present invention is preferably "one or more shape selected from the group consisting of a crushed shape, a honeycomb shape and a ring shape" (particularly preferably a crushed shape). By using the catalyst of such shapes, the gas/fluid can be circulated through the whole of a catalyst layer, and the substantial retention time of the fluid in the catalyst layer is prolonged to improve treatment performance significantly. The surface of the catalyst having these shapes such as crushed shape, as compared with a cylindrical or spherical catalyst, has a complicated shape thus significantly increasing the amount of fluid held up among catalyst particles and substantially prolonging the retention time, to achieve an efficient catalyst reaction in gas/fluid/solid phases. This effect is synergistically improved by subjecting an oxygen-containing gas and waste water to gas/fluid downstream parallel flowing as described later. The "one or more" means that the catalyst may be one alone or a mixture of two or more of the above shapes.

The "crushed shape" is not particularly limited insofar as the catalyst has been crushed into fine particles, but for exhibiting the high catalytic action described above, preferably, the catalyst of crushed shape having passed through a screen of 4 to 60 meshes in size (opening in the screen: 0.250 to 4.750 mm), more preferably through a screen of 4 to 32 meshes in size (opening in the screen: 0.500 to 4.750 mm), is used. By using the catalyst of such crushed shape, the amount of fluid held up can be increased, and the treatment of waste water at normal pressures in a low-temperature range, which cannot be achieved by a cylindrical or spherical catalyst, is made feasible.

The "honeycomb shape" in the present invention may be not only "honeycomb" in the original meaning, but also "lattice shape" or "corrugated shape", and the catalyst having hexagonal, tetragonal and trigonal openings is used. The diameter of an opening in honeycomb is 0.5 mm or more and 15 mm or less, preferably 1 mm or more and 8 mm or less. This is because when the diameter is less than 0.5 mm, pressure loss is increased, and particularly when solids are contained in waste water, clogging easily occurs to make long-term use of the catalyst difficult. In addition, a diameter of longer than 15 mm is not preferable because treatment performance is lowered although pressure loss is decreased and possibility of clogging is lowered.

The "ring shape" in the present invention may be any cylindrical structures. A section of the hollow cylinder is not particularly limited, and may be circular, elliptical or polygonal or may have a complicated shape. The outer diameter of the ring is 4 mm or more and less than 10 mm, preferably 4 mm or more and less than 8 mm. This is because when the outer diameter is 10 mm or more, the efficiency of contacting the catalyst with gas/fluid is lowered to reduce treatment performance, while when the outer diameter is less than 4 mm, the strength of the catalyst is lowered to make long-term stable treatment difficult. The inner diameter/outer diameter of the ring having an opening with a circular section is 0.1 or more and less than 0.8, preferably 0.3 or more and less than 0.7. When this ratio is 0.8 or more, the strength of the catalyst is lowered to make long-term stable treatment difficult. When the ratio is less than 0.1, the efficiency of contacting the catalyst with gas/fluid is lowered thus making use of the ring-shaped catalyst unnecessary.

The method of preparing the catalyst used in the present invention may be a general method of producing a catalyst. For example, the catalyst can be produced by impregnating an active carbon carrier having a desired shape and particle size, with a noble metal solution, then drying it and subjected it to reduction calcining treatment with a hydrogen-containing gas.

A suitable container for passing waste water (for example, reaction column 1 in FIG. 1) is charged with the catalyst thus produced. The density of the catalyst in the container is preferably 0.15 g/cc or more and less than 0.70 g/cc, more preferably 0.2 g/cc or more and less than 0.65 g/cc. This is because when the density is less than 0.15 g/cc, the amount of the catalyst is often insufficient for sufficiently exhibiting the catalytic action, while when the density is higher than 0.70 g/cc, permeation of waste water may be lowered to reduce the amount of fluid treated.

To initiate treatment of waste water after charging with the catalyst, it is preferable that in advance, the whole of the catalyst layer is moistened sufficiently with waste water or water. The method of moistening the catalyst layer sufficiently is not particularly limited, and may be a method of introducing a sufficient amount of waste water or water from the top of the container or a method of introducing fluid from the bottom to moisten the whole of the catalyst layer therewith. The whole of the catalyst is thereby sufficiently moistened to allow waste water to easily flow through the whole of the catalyst layer, whereby the whole area of the catalyst of special shape can be effectively utilized to improve treatment performance significantly.

The treatment of waste water according to the present invention is carried out in the presence of oxygen. This is because in the present invention, substances contained in waste water are treated mainly by oxidation reaction and/or decomposition reaction.

The "oxygen" allowed to be present during treatment of waste water may be oxygen ions present in the waste water, or a gas containing oxygen molecules may be used. The gas containing oxygen molecules is not particularly limited, and may be a pure oxygen gas, an oxygen-enriched gas, air, or the like, among which inexpensive air is preferably used. Depending on the case, they can be used after dilution with an inert gas. Oxygen-containing exhaust gas generated from plants or the like can also be used if necessary. As an oxygen source, hydrogen peroxide or the like can be used in place of the oxygen-containing gas.

The amount of oxygen supplied is not particularly limited, and oxygen may be supplied in an amount necessary for treating toxic substances in waste water. In the present invention, it is recommended to supply an oxygen-containing gas in a ratio of 0.2 to 15, preferably 0.5 to 5, to the theoretical amount of oxygen to treat the substances in waste water. This is because when the ratio is less than 0.2, the substance as the subject to be treated in waste water is not sufficiently decomposed in many cases, while even if a gas containing oxygen is supplied in a ratio of 15 or more, treatment performance is often not improved in proportion to the increased amount of oxygen.

When a gas containing oxygen is supplied in a ratio of less than 1 to the theoretical amount of oxygen, it is theoretically impossible to treat waste water completely. In actual operation, however, there is the case where complete treatment may not required depending on the type of compound contained (for example, desired treatment level: about 80%), and in this case, the amount of an oxygen-containing gas may be supplied in a ratio of less than 1 to the theoretical amount of oxygen. The amount of an oxygen-containing gas supplied may be determined so as to allow oxygen to remain in waste water after treatment.

The "theoretical amount of oxygen" is the amount of oxygen necessary for oxidization/decomposition treatment of substances to be oxidized in waste water to convert them into water, carbon dioxide gas, nitrogen gas and other ashes such as inorganic salts. The "theoretical amount of oxygen" can also be determined often by chemical oxygen demand (COD (Cr)).

The treatment temperature in the present invention is not particularly limited as long as 100° C. or less, preferably 20 to 100° C., more preferably 30 to 97° C. A temperature of higher than 100° C. is not preferable because the liquid phase cannot be maintained at normal pressures. When the temperature is less than 20° C., the treatment does not proceed sufficiently in many cases.

To increase the amount of oxygen dissolved in waste water during treatment, gas/fluid (oxygen-containing gas and waste water) are passed preferably in the form of downward parallel flow through the catalyst layer. This is because when gas/fluid are passed downwards in parallel flow, the efficiency of contacting the gas with fluid is generally improved to increase the amount of oxygen dissolved. However, when gas/fluid are passed downwards in parallel flow, a deviated flow easily occurs, and thus the whole of the catalyst cannot be effectively utilized in many cases, and the treatment does not sufficiently proceed in many cases. On the other hand, the catalyst of the invention described above can sufficiently exhibit the catalytic activity to treat waste water effectively even if the downward parallel flow is used to increase the amount of oxygen dissolved.

For allowing the oxygen-containing gas and waste water to pass in downward parallel gas/fluid flow, the oxygen-containing gas and waste water before supply to the catalyst layer should be pressurized to at least pressure loss of the catalyst layer. However, it is not necessary that the whole of waste water to be treated (the whole of a reaction site where the treatment of waste water proceeds) be pressurized at high degrees for maintaining the liquid phase even at 100° C. or more or for increasing the content of oxygen in waste water as in conventional techniques.

That is, in the conventional techniques of treating waste water, the whole of the reaction site is pressurized by a pressure control valve and the like arranged in an outlet of the reaction site. In the method of the present invention, on the other hand, a highly pressurizing unit is not necessary, and waste water can be treated while an outlet of the reaction site ("reaction column" in the Drawings) is opened. The method of treating waste water according to the present invention can be carried out at almost normal pressures. The "almost normal pressures" means the pressure of waste water and gas discharged from the reaction site, and a slight increase in this pressure, caused by preliminary pressurization into the reaction site for introducing gas/fluid in downward parallel flow, shall also be included in the "almost normal pressures". It is assumed that the actual pressure is included in the range of normal pressures (atmospheric pressure) to 1 MPa, and the upper limit is preferably 0.8 MPa, 0.5 MPa, 0.3 MPa, and 0.2 MPa. This is not only due to a problem in pressurizing facilities but also because the time of contacting waste water with the catalyst is reduced by pressurization higher than necessary.

In the present invention, the rate of waste water flowing to the catalyst is preferably in the range of 0.1 to 10 LHSV/hr, more preferably 0.3 to 7 LHSV/hr. A rate of less than 0.1 LHSV/hr is not preferable because the efficiency of treatment in proportion to the amount of the catalyst is hardly achieved and the catalyst cost is increased. A rate of higher than 10 LHSV/hr is not preferable because treatment performance is not often sufficient.

The treatment by wet oxidation in the present invention includes, for example, treatment by oxidation of ethanol into acetic acid, treatment by oxidative decomposition of acetic acid into carbon dioxide and water, treatment by decarbonation decomposition of acetic acid into carbon dioxide and methane, treatment by decomposition of various organic substances into low-molecular substances, treatment by hydrolysis of urea into ammonia and carbon dioxide, treatment by oxidative decomposition of ammonia and hydrazine into nitrogen gas and water, and treatment by dechlorination of organic halogen compounds, and it is meant that toxic substances in waste water are converted into substantially nontoxic substances.

The substances in waste water, that is, the subject of treatment in the present invention, are organic and/or inorganic compounds which can be oxidized and/or decomposed by the treatment method of the present invention, and the examples are organic compound, nitrogen compound, sulfur compound, organic halogen compound and organic phosphorus compound. Specific examples include organic compounds such as formic acid, acetic acid, propionic acid, acrylic acid, methanol, ethanol, propyl alcohol, isopropyl alcohol, formaldehyde, acetaldehyde, acetone, methyl ethyl ketone, ethylene glycol, THF and phenol; nitrogen compounds such as ammonia, hydrazine, nitrite ion, DMF and pyridine; sulfur compounds such as thiosulfate ion, sodium sulfide, dimethyl sulfoxide and alkyl benzene sulfonate; and hydrogen peroxide, among which the substances on which the present invention acts particularly effectively are formaldehyde, methanol, formic acid, ethanol, acetic acid, ethylene glycol and ammonia.

The concentration of the substances in total in waste water, as the subject of treatment in the present invention, is 10 mg/L or more and less than 120 g/L, preferably 100 mg/L or more and less than 80 g/L. The waste water including low- to high-concentration substances can be treated regardless of the concentration by the method of treating waste water according to the present invention. However, when the concentration is less than 10 mg/L, the waste water can be sufficiently treated without particularly using the treatment method of the present invention, while when the concentration is higher than 120 g/L, various kinds of controls, for example control of the treatment temperature for wet oxidation treatment and control of the amount of an oxygen-containing gas supplied, are difficult due to the high concentration.

The substances as the subject of the treatment may have been dissolved in water or be present in the form of suspended substances. The substances may be present in the form of salts. The type of waste water treated in the present invention includes, but is not limited to, waste water from chemical plants, semiconductor production factories, food processing facilities, metal processing facilities, metal plating facilities, printing factories and medical facilities, waste water from power stations such as thermal power station and nuclear power station, waste water from a waste incinerator, and dioxin-containing waste water such as exudates from a landfill. Preferably, the method of the invention is used to treat formaldehyde-containing waste water discharged from chemical plants such as formaldehyde production factories and medical facilities.

Before the treatment method is conducted, waste water can be subjected to membrane treatment and/or adsorption treatment with an adsorbent as pretreatment. The pretreatment can be combined with the treatment method of the present invention to further improve the efficiency of treatment.

The "membrane treatment" refers to a treatment step of separating waste water into a filtrate and a concentrate by passing the waste water through an MF membrane (precision membrane filter), UF membrane (ultrafiltration membrane), loose RO membrane (low-pressure reverse osmotic membrane), RO membrane (reverse osmotic membrane) or the like. The resulting concentrate contains concentrated organic compounds such as polymers, and can thus be easily treated and disposed of. On the other hand, the filtrate contains low-molecular compounds such as formaldehyde, which are relatively difficultly treated, but the filtrate can be treated at high degrees by the method of the above mentioned present invention.

With respect to the "MF membrane" used in the membrane treatment, the membrane material includes various organic and inorganic polymers, which are of flat membrane type, pleat type, spiral type, tube type, or the like, and the membrane is not particularly limited thereto.

With respect to the "UF membrane", the membrane material includes various materials such as cellulose acetate, polyacrylonitrile, polysulfone, polyether sulfone, high-molecular electrolyte complex, aromatic polyamide, polyvinyl alcohol, chitosan and acetyl curdlan, which are of flat membrane type, pleat type, spiral type, tube type, or the like. The UF membrane used in the present invention is not particularly limited thereto.

With respect to the "loose RO membrane", the membrane material includes various materials such as cellulose acetate, aromatic polyamide, heterocyclic polymer, water-soluble crosslinked polymer, crosslinked polymer of polymerizable monomers, or the like, which are of flat membrane type, pleat type, spiral type, tube type or the like. The loose RO membrane used in the present invention is not particularly limited thereto.

With respect to the "RO membrane", the membrane material includes various materials such as cellulose acetate, aromatic polyamide, heterocyclic polymer, water-soluble crosslinked polymer, crosslinked polymer of polymerizable monomers, or the like, which are of flat membrane type, pleat type, spiral type, tube type, or the like. The RO membrane used in the present invention is not particularly limited thereto. The treatment pressure in the membrane treatment is not particularly limited, and can be suitably determined depending on the treatment.

In the present invention, the type of membrane and the combination of membranes may be changed depending on the substance as the subject of treatment contained in waste water; for example when suspended substances are present in waste water, use of MF or UF membrane is effective, and when high-molecular compounds which can be poisoning components for the catalyst are contained, the UF membrane or loose RO membrane is used.

The "adsorption treatment with an adsorbent" mainly plays a role in removing substances poisoning the catalyst in the catalytic wet oxidization treatment of the present invention by an adsorbent. As the "adsorbent" used in this treatment, for example active carbon, silica gel, alumina gel, synthetic zeolite and ion-exchange resin can be generally used, among which active carbon is preferable. The type of active carbon is not particularly limited, and can be suitably selected from commercially available products of active carbon. The shape of active carbon is also not particularly limited, and active carbon can be suitably used in general forms such as pellet form, crushed form, powder form and ring form.

After the treatment of waste water in the present invention, oxidized substances such as organic acids (acetic acid or the like), ammonia or the like, contained in the treated fluid after the catalytic wet oxidization treatment, may be treated with a reverse osmotic membrane achieving a high degree of desalting, such as polyamide-based composite membrane. The fluid having passed through the reverse osmotic membrane is waste water hardly containing the oxidized substances, thus attaining high-degree treatment. On the other hand, waste water not passing through the reverse osmotic membrane contains concentrated oxidized substances such as organic acids, ammonia, or the like, and thus wet oxidization treatment of the waste water is conducted again to achieve high-degree treatment of the waste water.

The treated waste water after the catalytic wet oxidization treatment can be treated by biological treatment. After the method of the present invention is carried out, a majority of substances in waste water have been decomposed, and COD components and the like have also been considerably reduced. In addition, COD components and nitrogen compounds in the treated fluid after the treatment of the present invention are substances easily decomposable by biological treatment. Accordingly, the burden on biological treatment is very low.

The treated fluid subjected to the catalytic wet oxidation treatment of the present invention, or the treatment with a membrane and/or biological treatment or the like after the catalytic wet oxidation treatment, is mixed with waste water before the treatment and utilized as diluting water. Specifically, a method of treating waste water by circulating the treated fluid to use it as fluid for diluting waste water before treatment is one preferable embodiment of the present invention. Water conventionally required for dilution can thereby be significantly reduced to achieve treatment of waste water at lower costs.

BRIEF DESCRIPTION OF THE DRAWINGS

Symbols in FIGS. 1 and 2 are as follows: 1: reaction column; 2: electric heater; 3: waste water feed pump; 4: oxygen-containing gas flow meter; 5: heater; 6: cooler; 7: waste water line; 8: pretreatment unit (membrane treatment unit, active carbon adsorption unit); and 9: filtrate line.

BEST MODE FOR CARRYING OUT THE INVENTION

Hereinafter, the present invention is described in more detail by reference to the Examples, but the present invention is not limited thereto.

First, the catalyst was prepared in the following manner.

Catalyst A of the Present Invention

An active carbon carrier of 8 to 32 meshes in crushed form was impregnated with a nitric acid solution of dinitrodiammine platinum. Then, the carrier was dried at 90° C. in a nitrogen atmosphere and then subjected to reduction calcining treatment for 3 hours with a hydrogen-containing gas. The content of platinum in catalyst A thus obtained was 0.3 mass %. Measurement of the distribution of pores in the resulting catalyst by a nitrogen adsorption method indicated that pores having a radius of 40 Å or more and less than 100 Å were contained in a pore volume of 0.27 ml/g.

Catalyst B of the Present Invention

An active carbon carrier of 32 to 60 meshes in crushed form was impregnated with a nitric solution of dinitrodiammine platinum. Then, the carrier was dried at 90° C. in a nitrogen atmosphere and then subjected to reduction calcining treatment for 3 hours with a hydrogen-containing gas. The content of platinum in catalyst B thus obtained was 0.3 mass %. Measurement of the distribution of pores in the resulting catalyst by a nitrogen adsorption method indicated that pores having a radius of 40 Å or more and less than 100 Å were contained in a pore volume of 0.12 ml/g.

Conventional Catalyst C

Pellet-shaped active carbon having an average diameter of 4 mmϕ and an average length of 6 mmL was impregnated with a nitric acid solution of dinitrodiammine platinum. Then, the active carbon was dried at 90° C. in a nitrogen atmosphere and then subjected to reduction calcining treatment for 3 hours with a hydrogen-containing gas. The content of platinum in catalyst C thus obtained was 0.3 mass %. Measurement of the distribution of pores in the resulting catalyst by a nitrogen adsorption method indicated that pores having a radius of 40 Å or more and less than 100 Å were contained in a pore volume of 0.03 ml/g.

Catalyst D of the Present Invention

The same carrier as used in catalyst A was impregnated with a nitric acid solution of dinitrodiammine platinum and zirconia sol. Then, the carrier was dried at 90° C. in a nitrogen atmosphere, calcined at 200° C. for 3 hours in a nitrogen atmosphere and subjected to reduction calcining treatment for 3 hours with a hydrogen-containing gas. The content of platinum in the catalyst thus obtained was 0.3 mass %, and the content of $ZrO_2$ was 3 mass %. Measurement of the distribution of pores in the resulting catalyst by a nitrogen adsorption method indicated that pores having a radius of 40 Å or more and less than 100 Å were contained in a pore volume of 0.20 ml/g.

Conventional Catalyst E

An active carbon carrier of 8 to 32 meshes in crushed form was impregnated with a nitric acid solution of dinitrodiammine platinum. Then, the carrier was dried at 90° C. in a nitrogen atmosphere and then subjected to reduction calcining treatment for 3 hours with a hydrogen-containing gas. The content of platinum in the catalyst thus obtained was 0.3 mass %. Measurement of the distribution of pores in the resulting catalyst by a nitrogen adsorption method indicated that pores having a radius of 40 Å or more and less than 100 Å were contained in a pore volume of 0.03 ml/g.

EXAMPLES 1 AND 2, COMPARATIVE EXAMPLES 1 AND 2

Figure 1:
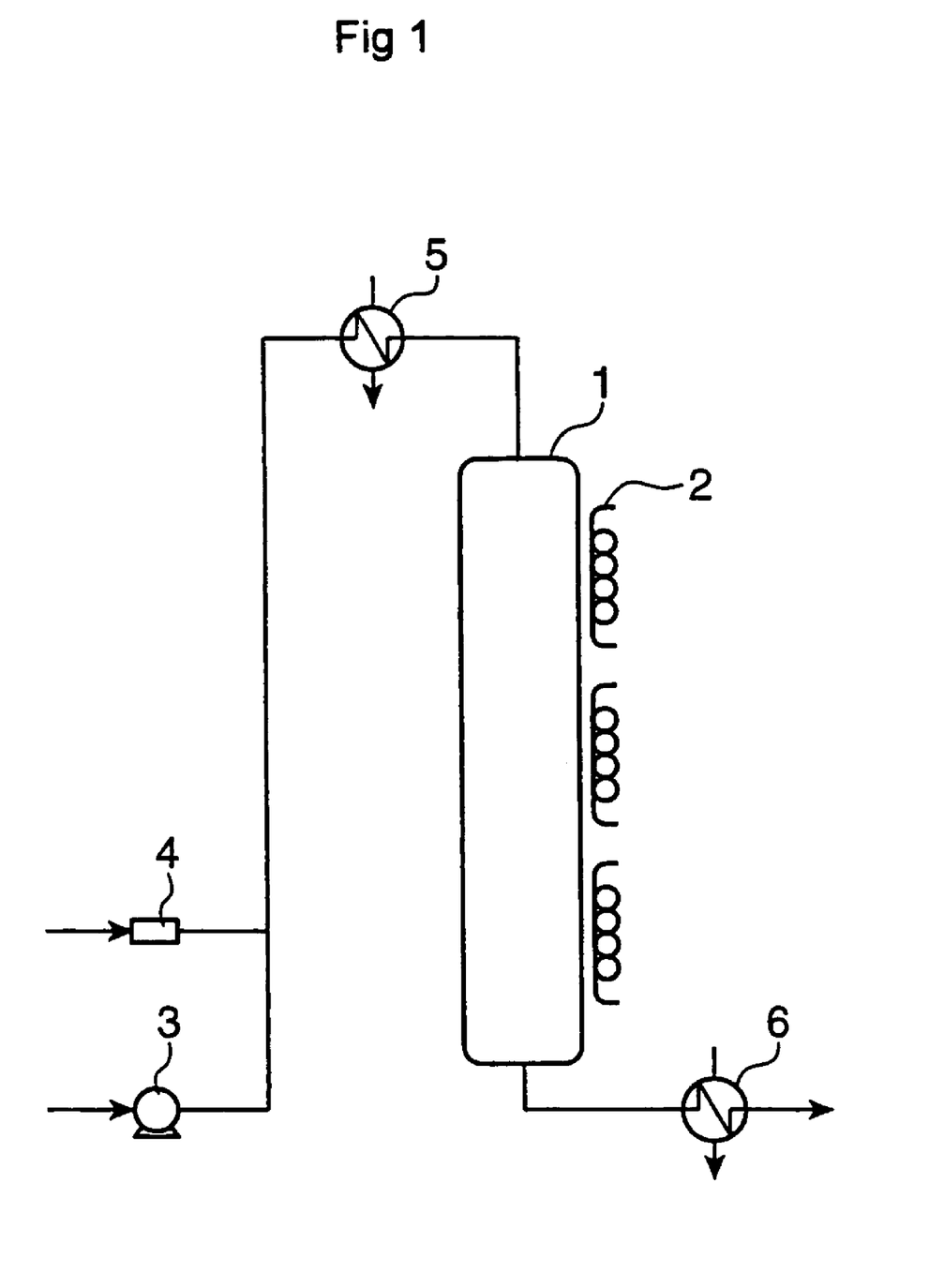
FIG. 1 is an illustration showing one example of the constitution of a treatment unit for carrying out the present invention.

By using the unit shown in FIG. 1, treatment was conducted for 100 hours under the following conditions. A reaction column 1 was a cylinder of 26 mm$\phi$ in diameter and 3,000 mm in length, and charged with 1 L of catalyst A. Waste water subjected to treatment was waste water containing 30 g/L of formaldehyde and 5 g/L of methanol. The amount of waste water supplied was 1.0 L/h, the treatment temperature was 60° C., and the amount of air supplied was twice as high as the theoretical amount of oxygen, and for the treatment, the waste water and air were passed in downward parallel flow. The pressurization required at the top of the reaction column for downward gas/fluid parallel flow was only 20 kPaG (0.02 MPaG), and the bottom of the reaction column was in an open system, and thus the pressure of the treated waste water and gas in the bottom of the reaction column was almost normal pressures.

By using the catalysts B, C and E, a treatment test was also carried out under the same conditions. The efficiency of treatment of COD (Cr) in waste water is shown in Table 1.

In each treatment test, pure water only was supplied through the top of the reaction column before the reaction, whereby the reaction column was filled with water to moisten the whole of the catalyst.

TABLE 1

| | Catalyst | Efficiency of treatment of COD (Cr) (%) |
|---|---|---|
| Example 1 | Catalyst A | 98 |
| Example 2 | Catalyst B | 83 |
| Comparative Example 1 | Catalyst C | 55 |
| Comparative Example 2 | Catalyst D | 61 |

The above results revealed that when the conventional catalyst in pellet form wherein the volume of pores having a radius of 40 Å or more and less than 100 Å was 0.03 ml/g was used (Comparative Example 1, catalyst C), waste water could not be sufficiently treated under the mild conditions of almost normal pressures at 60° C. This also applied to the case where catalyst E having a crushed shape but having a pore volume similar to that of catalyst C was used (Comparative Example 2).

On the other hand, it was revealed that when the catalyst of the invention in crushed form containing a noble metal (platinum) and active carbon was used, waste water could be treated with a high treatment efficiency of 80% or more, even under the mild treatment conditions. It was also revealed that when the catalyst active carbon carrier of 32 mesh or less was used, an extremely high treatment efficiency of 98% could be achieved.

EXAMPLES 3 TO 6

The unit shown in FIG. 1 was charged with 1.0 L of catalyst A and used to treat waste water shown in Table 2 below. The amount of waste water supplied was 1.0 L/h, the amount of air supplied was thrice as high as the theoretical amount of oxygen, and the treatment was conducted at each reaction temperature shown in Table 2. For allowing waste water and air to pass in downward parallel flow, the top of the reaction column was pressurized at 20 kPaG (0.02 MPaG), the bottom of the reaction column was in an open system, and the treatment was conducted at almost normal pressures in these examples similar to Examples 1 and 2. The efficiency of treatment of COD (Cr) in waste water is shown in Table 2. Before the reaction, only waste water was supplied through the top of the reaction column, and the reaction column was filled with the fluid to moisten the whole of the catalyst.

TABLE 2

| Waste water | | Reaction temperature (° C.) | Efficiency of treatment of COD (Cr) (%) |
|---|---|---|---|
| Example 3 | 20 g/L formic acid | 60 | 98 |
| Example 4 | 10 g/L ethanol | 93 | 80 |
| Example 5 | 10 g/L acetic acid | 95 | 78 |
| Example 6 | 10 g/L ethylene glycol | 95 | 84 |

The above results revealed that not only formaldehyde and methanol but also formic acid, ethanol, acetic acid and ethylene glycol could be efficiently treated according to the method for treating waste water according to the present invention.

EXAMPLE 7

The device shown in FIG. 1 was charged with 1.0 L of catalyst D. The waste water subjected to treatment was waste water containing 20 g/L of methanol, the amount of waste water supplied was 1.0 L/h, the amount of air supplied was 2.5 times as high as the theoretical amount of oxygen, and the treatment was conducted at a reaction temperature of 60° C. For allowing waste water and air to pass in downward parallel flow, the top of the reaction column was pressurized at 20 kPaG (0.02 MPaG), the bottom of the reaction column was in an open system, and the treatment was conducted at almost normal pressures in the example similar to Examples 1 and 2. Before the reaction, only waste water was supplied thorough the top of the reaction column, and the reaction column was filled with the fluid to moisten the whole of the catalyst.

As a result, the efficiency of treatment of COD (Cr) in waste water was 97%.

The results indicated that similarly to the treatment of waste water containing 5 g/L methanol (Examples 1 and 2), waste water containing methanol at a high concentration of 20 g/L could be treated by the method of treating waste water according to the present invention. That is, it was revealed that according to the method of the present invention, waste water could be treated regardless of the concentration of waste water.

EXAMPLE 8

Figure 2:
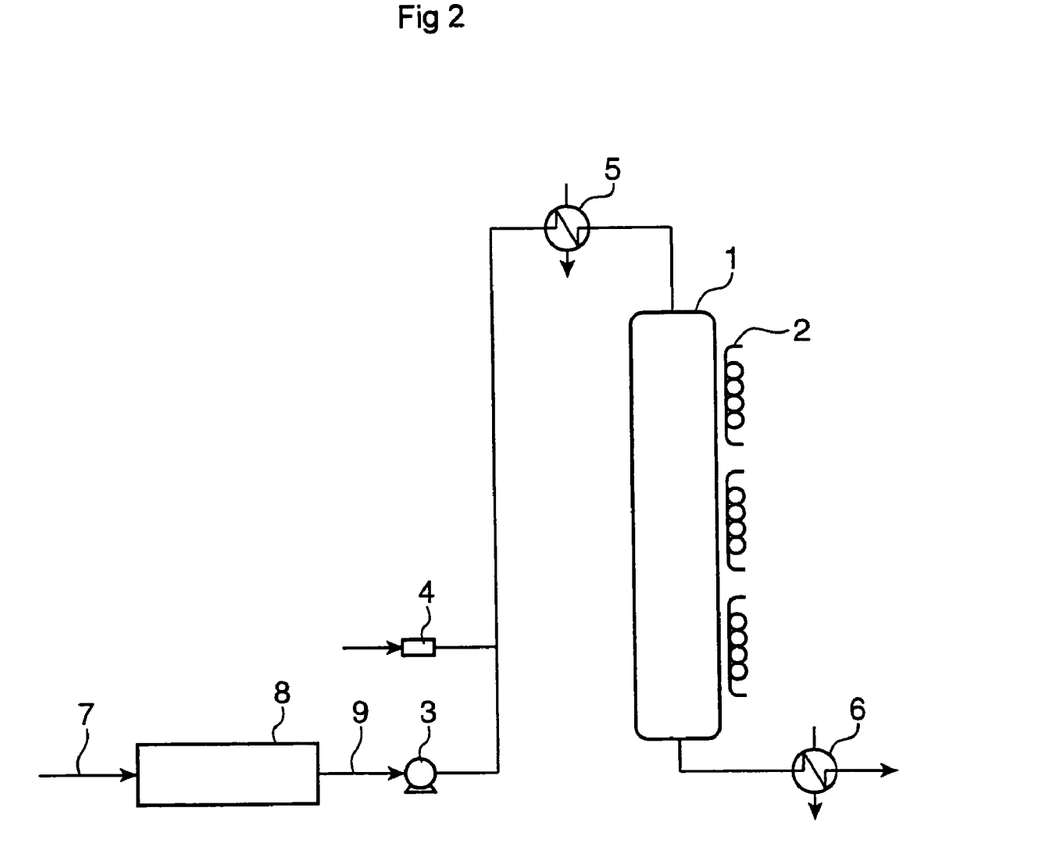
FIG. 2 is an illustration showing one example of the constitution of a treatment unit for carrying out the present invention.

By using the device shown in FIG. 2, the treatment of waste water was conducted for 2,000 hours under the following conditions.

The waste water subjected to treatment was waste water from a chemical factory, whose major components were 3,000 mg/L of formaldehyde, 200 mg/L of methanol, 1,000 mg/L of formic acid, and other organic compounds such as polymers, and COD (Cr) was 4,000 mg/L. A majority of organic substances contained in the waste water from a tank were discharged as a concentrate (excluding formaldehyde, methanol and formic acid) concentrated about 3-fold by a membrane treatment unit 14 provided with polyacrylonitrile-based UF membrane. On the other hand, formaldehyde, methanol and formic acid from the waste water were contained at almost original concentrations in the filtrate, and the filtrate was subjected to the catalytic wet oxidization treatment.

A reaction column 7 was a cylinder of 40 mmφ in diameter and 2,000 mm in length, and charged with 2 L of catalyst A. The treatment was conducted at a treatment temperature of 60° C. at almost normal pressures similarly to Examples 1 and 2. The amount of waste water supplied was 3 L/hr, and the amount of air supplied was 1.3 times as high as the theoretical amount of oxygen.

The result of the waste water treatment indicated that the efficiency of treatment of COD (Cr) in waste water after 2,000 hours was as high as 96%.

EXAMPLE 9

By using the device shown in FIG. 2, the treatment of waste water was conducted for 1,000 hours under the following conditions.

An active carbon adsorption device 14 was charged with commercial active carbon having an average diameter of 4 mmφ and an average length of 5 mmL. The waste water subjected to treatment was the same as shown in Example 8. The waste water was passed so as to give a rate of 0.5 LV/hr through the active carbon adsorption device, to adsorb organic substances such as polymers in the waster fluid. On the other hand, the filtrate containing formaldehyde, methanol, formic acid, or the like as major components was subjected to the catalytic wet oxidization treatment with catalyst A in the same manner as that of Example 8.

The result of the waste water treatment indicated that the efficiency of treatment of COD (Cr) in waste water after 1,000 hours was as high as 95%.

INDUSTRIAL APPLICABILITY

The present invention was constituted as described above, and although the method of treating waste water according to the present invention relates to catalytic wet oxidization treatment, enables the treatment at relatively low temperatures at almost normal pressures, which has never achieved by conventional methods. Therefore, necessary facilities themselves can be made compact and the treatment is feasible at low costs. According to the present invention, waste water as the subject of the treatment can be treated regardless of the concentration of the waste water.

Accordingly, the method of treating waste water according to the present invention is extremely industrially applicable as a method of treating waste water at low costs which is applicable to a waste water treatment system or the like in factories.

The invention claimed is:

1. A method for treating waste water, which comprises subjecting waste water to a temperature of 100° C. or less in the presence of oxygen and catalyst containing noble metal and active carbon and having pores, and the volume of the pores having a radius of 40 Å or more and less than 100 Å is 0.05 ml/g or more, to oxidize and/or decompose organic or inorganic substances contained in the wastewater.

2. The method for treating waste water according to claim 1, wherein the catalyst has one or more shape selected from the group consisting of a crushed shape, a honeycomb shape and a ring shape.

3. The method for treating waste water according to claim 2, wherein the shape of the catalyst is a crushed shape.

4. The method for treating waste water according to claim 3, wherein the waste water contains at least one member selected from the group consisting of formaldehyde, methanol, formic acid, ethanol, acetic acid, ethylene glycol and ammonia.

5. The method for treating waste water according to claim 3, wherein the waste water is subjected to membrane treatment and/or adsorption treatment with an adsorbent as pretreatment.

6. The method for treating waste water according to claim 2, wherein oxygen-containing gas is used.

7. The method for treating waste water according to claim 2, wherein the volume of the pores is 0.1 ml/g or more.

8. The method for treating waste water according to claim 2, wherein the waste water contains at least one member selected from the group consisting of formaldehyde, methanol, formic acid, ethanol, acetic acid, ethylene glycol and ammonia.

9. The method for treating waste water according to claim 2, wherein the waste water is subjected to membrane treatment and/or adsorption treatment with an adsorbent as pretreatment.

10. The method for treating waste water according to claim 1, wherein oxygen-containing gas is used.

11. The method for treating waste water according to claim 10, wherein the oxygen-containing gas and the waste water are passed in gas/fluid downward parallel flow.

12. The method for treating waste water according to claim 11, wherein air is used as the oxygen-containing gas.

13. The method for treating waste water according to claim 11, wherein the volume of the pores is 0.1 ml/g or more.

14. The method for treating waste water according to claim 11, wherein the shape of the catalyst is a crushed shape.

15. The method for treating waste water according to claim 11, wherein the waste water contains at least one member selected from the group consisting of formaldehyde, methanol, formic acid, ethanol, acetic acid, ethylene glycol and ammonia.

16. The method for treating waste water according to claim 11, wherein the waste water is subjected to membrane treatment and/or adsorption treatment with an adsorbent as pretreatment.

17. The method for treating waste water according to claim 10, wherein air is used as the oxygen-containing gas.

18. The method for treating waste water according to claim 17, wherein the volume of the pores is 0.1 ml/g or more.

19. The method for treating waste water according to claim 17, wherein the shape of the catalyst is a crushed shape.

20. The method for treating waste water according to claim 17, wherein the waste water contains at least one member selected from the group consisting of formaldehyde, methanol, formic acid, ethanol, acetic acid, ethylene glycol and ammonia.

21. The method for treating waste water according to claim 17, wherein the waste water is subjected to membrane treatment and/or adsorption treatment with an adsorbent as pretreatment.

22. The method for treating waste water according to claim 10, wherein the volume of the pores is 0.1 ml/g or more.

23. The method for treating waste water according to claim 10, wherein the shape of the catalyst is a crushed shape.

24. The method for treating waste water according to claim 10, wherein the waste water contains at least one member selected from the group consisting of formaldehyde, methanol, formic acid, ethanol, acetic acid, ethylene glycol and ammonia.

25. The method for treating waste water according to claim 10, wherein the waste water is subjected to membrane treatment and/or adsorption treatment with an adsorbent as pretreatment.

26. The method for treating waste water according to claim 1, wherein the volume of the pores is 0.1 ml/g or more.

27. The method for treating waste water according to claim 26, wherein the shape of the catalyst is a crushed shape.

28. The method for treating waste water according to claim 26, wherein the waste water contains at least one member selected from the group consisting of formaldehyde, methanol, formic acid, ethanol, acetic acid, ethylene glycol and ammonia.

29. The method for treating waste water according to claim 26, wherein the waste water is subjected to membrane treatment and/or adsorption treatment with an adsorbent as pretreatment.

30. The method for treating waste water according to claim 1, wherein the waste water contains at least one member selected from the group consisting of formaldehyde, methanol, formic acid, ethanol, acetic acid, ethylene glycol and ammonia.

31. The method for treating waste water according to claim 30, wherein the waste water contains formaldehyde.

32. The method for treating waste water according to claim 31, wherein the waste water is subjected to membrane treatment and/or adsorption treatment with an adsorbent as pretreatment.

33. The method for treating waste water according to claim 30, wherein the waste water is subjected to membrane treatment and/or adsorption treatment with an adsorbent as pretreatment.

34. The method for treating waste water according to claim 1, wherein the waste water is subjected to membrane treatment and/or adsorption treatment with an adsorbent as pretreatment.

* * * * *